July 22, 1952 G. GORHAM 2,604,248
AUTOMATIC-FRACTION COLLECTION APPARATUS
Filed July 21, 1949 6 Sheets-Sheet 2

INVENTOR.
GEORGE GORHAM
BY Edwin Levisohn +
Harry Cohn
ATTORNEYS

July 22, 1952

G. GORHAM 2,604,248

AUTOMATIC-FRACTION COLLECTION APPARATUS

Filed July 21, 1949

INVENTOR.
GEORGE GORHAM

BY Edwin Levisohn +
Harry Cole
ATTORNEYS

July 22, 1952  G. GORHAM  2,604,248
AUTOMATIC-FRACTION COLLECTION APPARATUS
Filed July 21, 1949  6 Sheets-Sheet 5

INVENTOR.
GEORGE GORHAM
ATTORNEYS

Fig. 19

Patented July 22, 1952

2,604,248

UNITED STATES PATENT OFFICE 2,604,248

AUTOMATIC-FRACTION COLLECTION APPARATUS

George Gorham, New York, N. Y., assignor to Technicon Chromatography Corporation, New York, N. Y., a corporation Application July 21, 1949, Serial No. 105,986

36 Claims. (Cl. 226—96)

This invention relates to an automatic fraction-collection apparatus.

In my prior applications Ser. No. 772,389 filed September 5, 1947, and Ser. No. 12,130, filed February 28, 1948, I have disclosed and claimed fraction-collection apparatus of the general type with which the present invention is concerned.

One object of the present invention is the provision of fraction-collection apparatus which, for certain purposes, may be used in lieu of the more expensive apparatus of my prior applications which has an extremely high degree of accuracy and refinements of control that may be unnecessary in various processes. It is to be understood, however, that a high degree of accuracy is nevertheless achieved by the present apparatus for use in supplying accurately measured quantities of liquid or other fluent material to the containers or receptacles. Also, in certain of its aspects, the present invention provides advantageous features which may be embodied in fraction-collection apparatus possessing the more highly refined control elements of the apparatus of my prior applications.

Another object of the present invention is the provision of a simplified arrangement for supplying the material to the various receptacles. More specifically, pursuant to the present invention, when the apparatus is used for chromatography analysis, for example, the column tube and supply may be stationary at all times and yet the fractions may be collected in a large number of receptacles disposed in each of a plurality of spaced rows without moving the receptacle rack or support laterally of said rows.

A further object is generally to provide an automatic fraction-collector which is simple in construction and reliable in operation.

The invention and the above mentioned and other objects, features and advantages thereof will be fully understood from the following description considered in connection with the accompanying illustrative drawings.

Briefly described, the apparatus of the present invention comprises a movable rack or framework on which a plurality of receptacles are arranged in each of a plurality of laterally related rows, each of which extends in the direction of movement of the rack. A liquid or other material-supply device is associated with the apparatus and includes a funnel device having a passage therethrough for the liquid, or other substance which is to be supplied to said receptacles, mounted for movement laterally of the receptacle-rows of the rack for directing the material to the receptacles in the different rows. The rack is moved step by step to carry each receptacle to a position at the outlet of the directing means or funnel for the supply of the substance to each receptacle. When the substance is to be supplied to more than one row of receptacles, the funnel is moved automatically from one row to another. Means including a timing device which may be either a time-responsive device or a drop-counter for accurately determining and measuring the quantity of substance to be supplied to each of said predetermined number of receptacles are preferably utilized, but other charge-measuring devices may be used within the scope of the invention. Suitable means such as an electric motor is utilized for actuating the rack-moving mechanism and provision is made to terminate the operation of the apparatus as soon as the last receptacle is charged.

The apparatus, in the form herein described, was specifically designed for a use as a fraction-collector in chromatographic analysis. See for example, "Principles and Practice of Chromatography" by Zechmeister and Cholnoky, translated by Bachrach and Robinson, published by John Wiley & Sons, Inc., New York. In this particular use of the apparatus, a liquid is passed through or in contact with an absorbent substance of the column in a tube, according to known practice in the art of chromatography, and issues from the outlet of said tube drop by drop, and similarly passes, drop by drop, through the passage of the above mentioned funnel device. It will be understood that the duration of the interval between two successive movements of the rack determines the quantity of liquid supplied to each receptacle, and that this interval of rest of the rack is controlled by the counter which, as explained above, controls the operations of the motor which moves the rack. It is to be understood, however, that the apparatus may be used for various other purposes.

The apparatus will now be described in detail with reference to the above mentioned use thereof, but it will be understood that, as previously stated, it may be used for other purposes.

Figure 2:
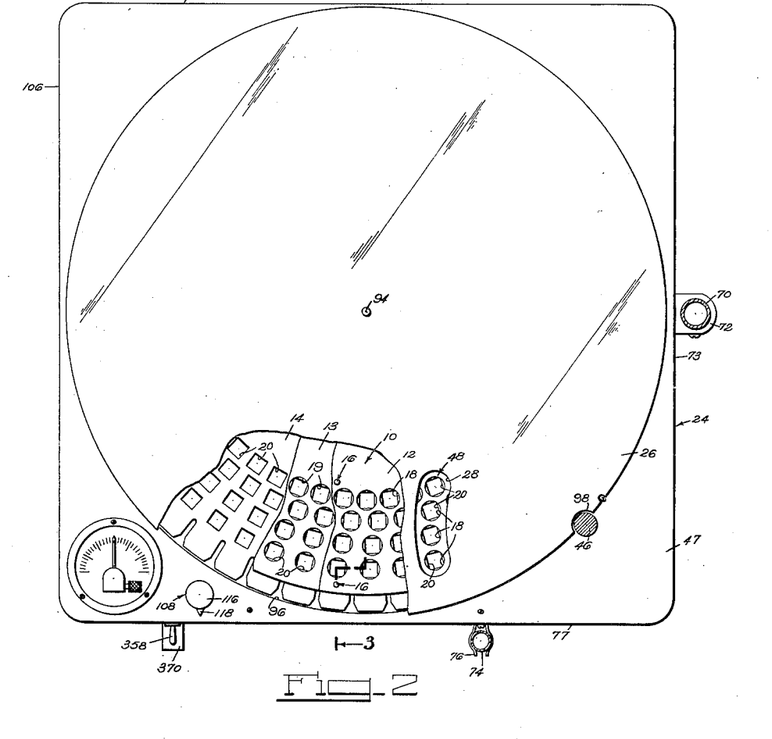
Fig. 2 is a plan view, partly in section, on the line 2—2 of Fig. 1, with parts cut away for the purpose of illustration.
Figures 3, 3A:
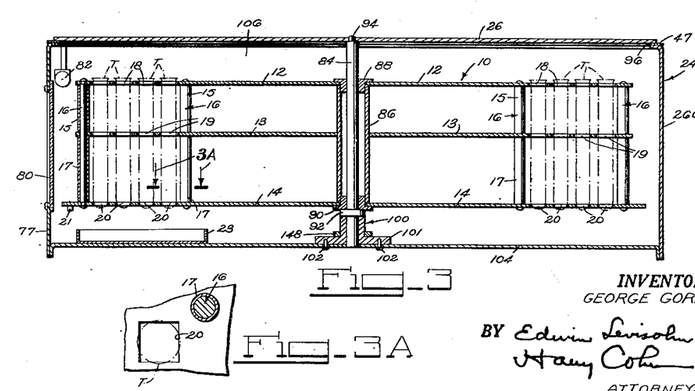
Fig. 3 is a vertical sectional view on the line 3—3 of Fig. 2.
Fig. 3A is a sectional view on the line 3A—3A of Fig. 3.

In the use to which the apparatus is presently being put, accurately measured uniform quantities of liquid are collected in a multiplicity of test tubes or other suitable receptacles or containers which, in the form of the apparatus herein disclosed, are carried by a rotatable rack 10 (Figs. 2 and 3). The liquid receiving receptacles or containers, a few of which are indicated at T in Figs. 3 and 3A, are disposed in each of a plurality of laterally related rows, here shown as circular rows, the rack or container-supporting means 10 being circular. The containers are held removably in upright position and in uniform circumferentially spaced relation in each row by the horizontal plates or discs 12 and 14 which are secured in vertically spaced relation by the spacing posts 16. For this purpose, plate 12 is provided with a plurality of circumferentially spaced circular openings 18 for the outermost row of containers, and similar openings are provided in plate 12 for each of the other rows, there being four of such rows, in the apparatus as now constructed, as shown in Fig. 2. The lower plate 14 is similarly provided with four circular rows of circumferentially spaced openings as indicated at 20 in Figs. 2 and 3, the openings in each row being in registry with the openings in the respective rows of plate 12 to support and position the test tubes. To facilitate the insertion of the receptacles into the openings 20 in the lower plate 14, an intermediate plate 13 is mounted between plates 12 and 14. Said intermediate plate is maintained in spaced relation to the other plates by sleeves 15 and 17 which are disposed on the spacing posts 16, above and below, plate 13 through which said posts extend, said intermediate plate being provided with circular openings 19 in registry with openings 18 and 20. It will be apparent that by inserting a receptacle in openings 18 and 19, said receptacle will be properly positioned for insertion in openings 20. Openings 20 (Fig. 3A) are preferably square, rather than circular, so that any excess of liquid which flows down the sides of the receptacles will have sufficient space between the sides of openings 20 and the outer surface of the receptacle to flow through the lower plate 14 and into a drain pan 23 which is placed beneath said lower plate below the receptacles charging station. It will be noted, however, that said square openings are sufficiently small to prevent the test tubes from moving downwardly therethrough. If preferred, a drain pipe (not shown) may be provided for the drain pan.

The lower plate is also provided with a downwardly projecting pin 21, the function of which will presently appear.

Rack 10 is mounted for rotation about a vertical axis, as hereinafter more particularly described, and is moved intermittently, i. e., stepwise, for presenting each of the containers of each row successively at the liquid-receiving station at which the material-supply device 22 (Fig. 1) is mounted. It will be noted that the rack is disposed removably within a stationary housing 24 provided with a removable cover 26 and that the latter has a slot or opening 28 to allow the passage of the liquid from the outlet 30 of unit 22 through the funnel 32 into the receptacle T at the liquid-receiving station. The funnel 32 is mounted for controlled step movement laterally of the rows of containers into positions in which the liquid outlet 34 of said funnel registers with the containers in each of the laterally related rows, respectively, of the rack. More particularly, the funnel 32 may be first positioned in registry with the innermost row of containers so as to supply liquid to each of the containers in said innermost row during one revolution of rack 10, after which the funnel is pivoted so that outlet 34 is moved in succession outwardly to the other rows for supplying liquid to each of the containers of each of said other rows during the next three revolutions of the rack.

Funnel 32 is provided with a vertically disposed mouth portion 36 which empties into a constricted horizontally disposed tubular part or liquid passageway 38 which terminates in the down-turned liquid outlet or dropper 34. As here shown, the funnel is releasably mounted in pinch-clips 40 which engage part 38 of the funnel, said clips being carried by the cross-bar 42 of a vertically disposed bracket 44 mounted for pivotal movement on a rotatable support or stud 46 projecting above the upper housing wall 47. As hereinafter more particularly described, said bracket turns with the support or stud 46 about the vertical axis of the latter in pivotally moving the funnel from one row of containers or receptacles T to each of said other rows. Accordingly, funnel outlet or dropper 34 is movable in an arcuate path from one row of receptacles to another. In this connection, it will be noted that opening 28 of cover 26 is arcuately shaped and has its center of curvature at the axis of stud 46, and further it will be observed that, as clearly shown in Fig. 2, the laterally aligned openings in plates 12 and 14 are disposed along the arc of a circle which has its center at the axis of stud 46 when each set of laterally related openings of the several rows are at the liquid-receiving station, as indicated at 48 in Fig. 2.

Figures 1, 1A:
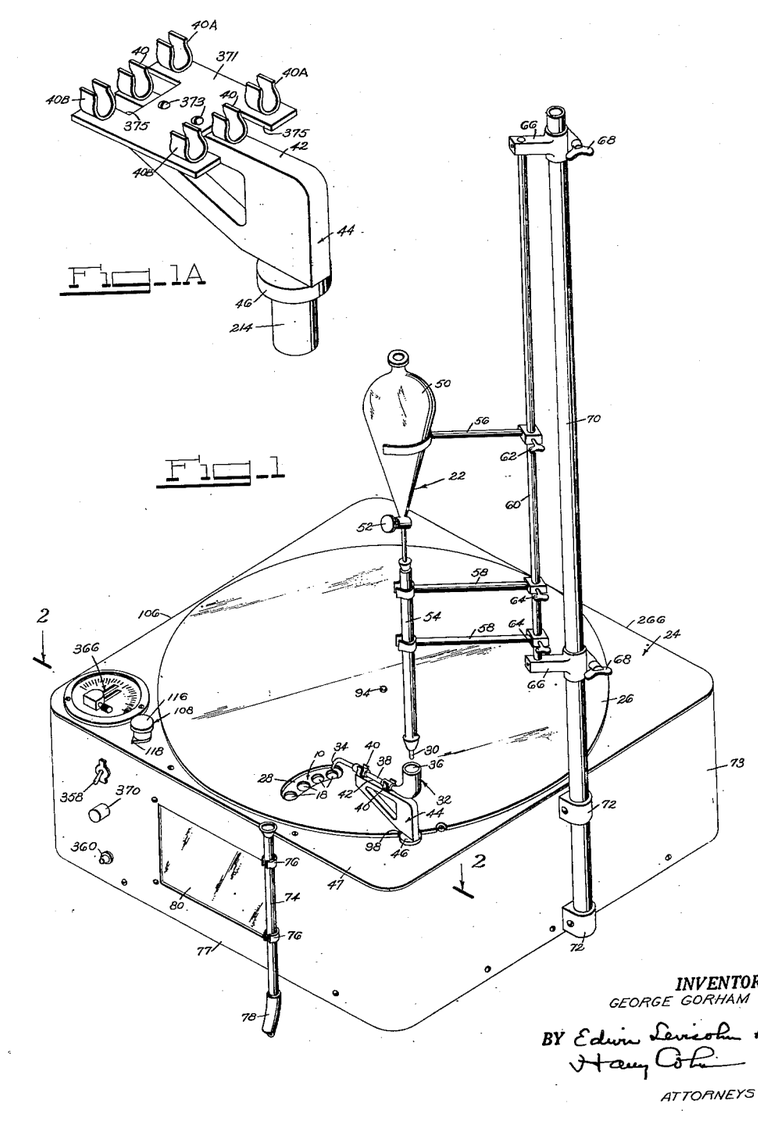
Fig. 1 is a perspective view of an automatic fraction-collector apparatus embodying the present invention.
Fig. 1A is a perspective view showing a modification.

As illustrated in Fig. 1, the liquid, which is supplied to the receptacles in the rack 10, is provided in a supply container 50 having an adjustable valve 52 at its outlet from which the liquid flows through a tube 54 of the column for treatment by a substance contained therein, depending upon the process for which the apparatus is to be used. From the outlet 30 of the tube 54 the liquid flows intermittently, i. e., drop by drop, the drops being of the same volumetric size, into the mouth 36 of the funnel 32 carried by the bracket 44. The drops of liquid pass through outlet 34 of the funnel into a test tube at the liquid-receiving station. After the predetermined number of drops of liquid are supplied to the test tube at the liquid-receiving station, the rack 10 is turned one step whereby to bring the next test tube into position at the liquid receiving station. More particularly, and as hereinafter described in detail, the rack 10 is turned by a motor which is interrupted for a predetermined time interval while each test tube is in liquid-receiving position, said interval determining the amount of liquid that is supplied to the test tube, said motor being energized at the end of said interval to move the next test tube into liquid-receiving position whereupon the motor is cut off and the cycle is repeated. In this manner rack 10 is turned intermittently in order to carry the liquid-receiving receptacles T successively to the liquid-receiving station and allow sufficient time for each receptacle at said station to receive a predetermined quantity or charge of liquid. After all or any predetermined number of the receptacles in one row are supplied with the predetermined quantities of liquid, funnel 32 is automatically moved to the next row, it being noted that mouth 36 is always disposed in registry with outlet 30, regardless of the position of funnel outlet 34. To maintain outlet 30 in position to drop liquid into funnel 32, container 50 and tube 54 are carried by supports or brackets 56 and 58, respectively, which are releasably and adjustably secured to the vertically disposed rod 60 in any suitable way, as by clamping screws 62 and 64, respectively. Rod 60 is secured at each of its ends in a support 66 which is adjustably and releasably secured, as by clamping screws 68, to an upright post 70 carried by brackets 72 secured to side wall 73 of housing 24.

In the apparatus which has been constructed and operated pursuant to the present invention, there is provision for 50 test tubes in each of the four rows, or a total of 200 test tubes. As will hereinafter appear, the apparatus may be set so as to supply a predetermined quantity of liquid to all of the 200 test tubes or to any predetermined smaller number of test tubes, according to requirements. Upon the termination of the test tube filling process funnel 32 is automatically moved to discharge the liquid into a drain 74 removably secured in pinch clips 76 affixed to side wall 77 of housing 24, said drain permitting the excess liquid to be discharged through tubing 78 into a receptacle (not shown). Housing wall 77 is provided with a window 80 and with a light source 82 (Fig. 3), here shown as a fluorescent light, whereby the receptacles and the contents thereof may be inspected without requiring removal of the rack from the housing.

Rack 10 is mounted for turning movement on a stationary vertical shaft or post 84 (Fig. 3), said rack being provided at its center with a cylinder 86 secured to plates 12 and 14, said cylinder being secured to the spaced flanged bearing bushings 88 and 90, each of which is pressed into one end of the cylinder. The lower bushing 90 is supported on the horizontal bearing shoulder 92 and said bushings are rotatable on said shaft. A reduced end portion 94 of the shaft projects through the center of cover 26, said cover being disposed on upper housing wall 47 to overlie the circular opening 96 therein (Fig. 3). With feed unit 22 rotated clear of housing 24 and with bracket 44 pivoted clear of cover 26, the cover may be removed and the rack may then be removed through opening 96. Thus, it will be noted that the rack is conveniently portable. The cover is provided with a cut-out portion 98 to accommodate stud 46, it being noted that with said cut-out portion adjacent the stud, the opening 28 in the cover is correctly positioned relative bracket 44 and funnel 32. Stationary shaft 84 is mounted in upright position in a fixed cylindrical part 100 having a flanged portion 101 secured by screws 102 in the center of the upper surface of bottom wall 104 of housing 24.

The mechanism for positioning funnel 32 to transmit the liquid into a predetermined row of receptacles and thereafter to automatically pivot the funnel to charge the receptacles in the next outermost row comprises the link assembly 106 (Fig. 4) operated by the control unit 108 (Fig. 1), the pawl unit 111, and the ratchet plate 113 (Figs. 5–8, and 12). Control unit 108 is provided with the rotatable shaft 110 (Fig. 9) having a reduced portion 112 which extends through a bearing bushing 114 secured in the upper housing-wall 47. A control knob 116, provided with an indicator 118, is fastened to shaft portion 112 for manually rotating the shaft. The lower end of said shaft is secured in a rotatable sleeve 120 by a screw 122 and said sleeve is provided with a horizontal cam 124 and is rotatable on a stationary bearing stud 126. The latter is provided with a flanged portion 128 secured by screws 130 to the upper surface of bottom wall 104 adjacent side wall 77 of housing 24.

Figure 10:
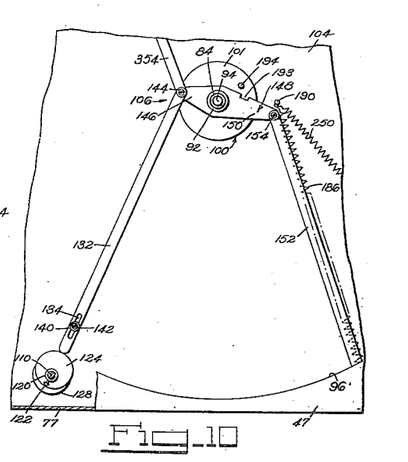
Fig. 10 is a fragmentary view of a portion of the apparatus shown in Fig. 4.

In a predetermined position (Fig. 10) of shaft 110 as set by control knob 116, the cam 124 engages link 132 and holds it in a predetermined position. Link 132 is provided with a longitudinal slot 134 in which is disposed the neck 136 of a vertically mounted guide stud 138 which is secured on the upper surface of bottom wall 104 by a screw 140 and a washer 142, said stud serving to guide link 132 when it is moved by shaft 110 from its retracted position shown in Fig. 4 to its projected position shown in Fig. 10. The inner end of link 132 is secured by a pivot screw 144 to one end 146 of a lever 148 which is centrally apertured and mounted for rotation on cylindrical part 100 (Fig. 3) in which rack shaft 84 is mounted. The other end 150 of lever 148 is secured to one end of the link 152 by a pivot screw 154, said link 152 being apertured at its other end for mounting on the reduced portion 156 (Fig. 12) of a vertically disposed post 158. The latter is provided with a central bore 160 for a screw 162 provided with washer 164, said screw mounting said post on the free end 166 of pivoted plate 168 of pawl unit 111. Plate 168 is pivotally secured at its other end to bottom wall 104 of housing 24, adjacent the corner formed by the intersection of side walls 73 and 77. More particularly, said plate is provided with a bushing 170 in which is disposed screw 172 which is threaded into bottom wall 104 and secured thereto by nut 174, a washer 176 being disposed between the screw and the upper surface of plate 168. Plate 168 is also provided with a transverse slot 178 (Fig. 5) in which is disposed screw 180 secured to bottom wall 104 by nut 182 (Fig. 12) said screw extending above plate 168 and being provided with a washer 183 which overlies the slot and is biased against the plate by spring 184 mounted on screw 180 to retain the plate against vertical movement.

Figures 4, 5, 6, 7:
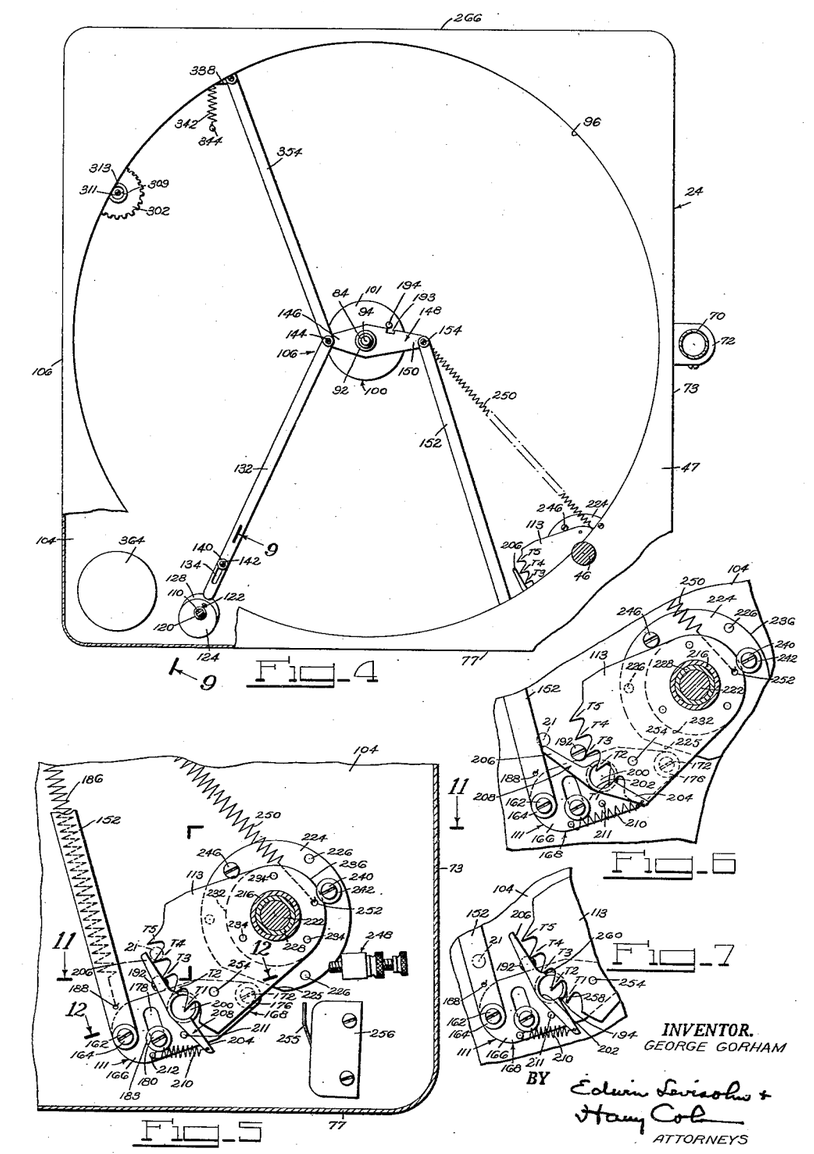
Fig. 4 is a view similar to Fig. 2 with parts removed for the purpose of illustration.
Fig. 5 is a plan view partly in section, of a mechanism forming part of the apparatus, showing said mechanism in one operating position thereof.
Fig. 6 is a fragmentary view showing the mechanism of Fig. 5 in another operating position thereof.
Fig. 7 is a fragmentary view showing the mechanism of Fig. 5 in still another operating position thereof.
Figure 11:
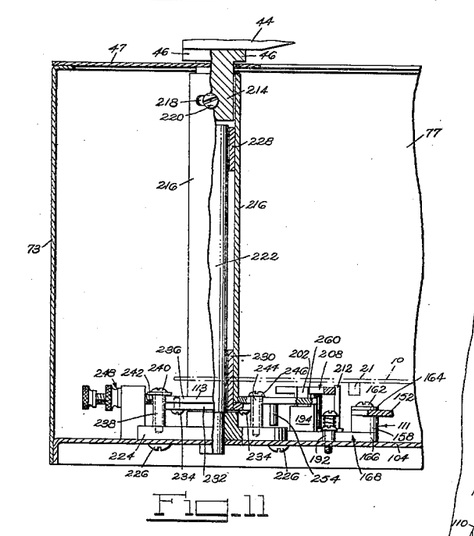
Fig. 11 is a sectional view on the line 11—11 of Fig. 5.
Figure 12:
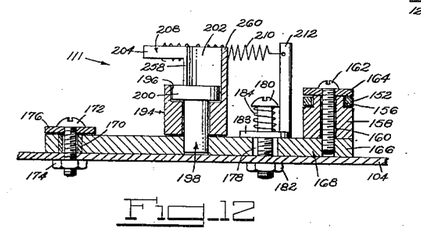
Fig. 12 is a sectional view on the line 12—12 of Fig. 5.

It will be apparent that when knob 116 is rotated to a position where cam 124 engages link 132, said link is moved from its retracted position (Fig. 4) to its projected position (Fig. 10) thereby moving end 146 of lever 148 in the direction of movement of link 132 whereby said lever is pivoted on part 100 and end 150 of said lever moves in a direction opposite the movement of link 132, whereupon link 152 is moved in a direction opposite the direction in which link 132 is moved. Said movement of link 152 causes pawl plate 168 to pivot about screw 172 to its projected position shown in Fig. 8. Fig. 5 illustrates the retracted position of plate 168 when cam 124 is disengaged from link 132, lever 148 being in its normal position (as in Fig. 4). Link 152 is retracted by a spring 186 which is secured at one end to link 152 as at 188, and secured at its other end to pin 190 (Fig. 10) fixed to bottom wall 104. It will be noted that lever 148 is provided with a cut-out portion 193 (Fig. 4) which engages screw 194 on flange portion 101 to limit the movement of said lever against the tension of spring 186 when cam 124 disengages link 132. It will also be noted that stop 192 (Figs. 5 and 11) mounted in bottom wall 104 serves as a detent to limit the movement of plate 168 in its retracted position, screw 180 and washer 183 serving to guide the plate in its pivotal movement about screw 172.

Plate 168 is also provided with a cylindrical part 194 provided with an internal recess or seat 196 (Fig. 12), said part being mounted for rotation about a post 198 fixedly mounted in the plate and provided with a circular head portion 200 disposed in said recess. Part 194 has an arcuate portion 202, above recess, which is provided with the integral horizontally extending arms 204 and 206 forming a double-acting pawl 208 which is biased for clockwise rotation, viewing Fig. 5, by a spring 210 secured to arm 204 and to a pin 212 mounted on plate 168. Detent 211 limits said clockwise rotation of pawl 208 which cooperates with ratchet plate 113, which is operatively connected to bracket 44 for turning the latter and funnel 32 carried thereby. Support stud 46 (Fig. 11), on which said bracket is mounted, has a part 214 which projects through upper wall 47 and is disposed in the upper portion of a rotatable vertically disposed column or cylinder 216 which is provided with a transverse slot 218 through which screw 220 projects for securing the stud in said cylinder, said slot allowing for adjustably positioning the stud in the cylinder. Said cylinder is mounted on a vertically disposed stationary shaft 222 which is secured in a flanged mounting member 224 secured to bottom wall 104 by screws 226, bushings 228 and 230 being pressed into the cylinder and providing bearing surfaces for the cylinder.

Figure 8:
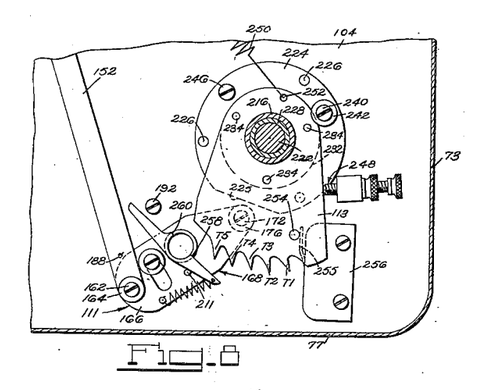
Fig. 8 is a view similar to Fig. 5 showing said mechanism in its inoperative position.

A support-plate 232 is pressed onto the bottom of bushing 230 and is disposed on the upper part of member 224. Ratchet plate 113 is mounted on cylinder 216 and overlies support-plate 232 to which it is secured by screws 234. It will be understood that ratchet plate 113 is rotatable with cylinder 216 about shaft 222, the arcuate marginal edge portion 236 (Fig. 5) of the ratchet plate being adjacent a sleeve 238 mounted on the flanged portion of part 224 by a screw 240 and a washer 242 which overlies said edge portion to prevent vertical motion thereof. Clockwise rotation of the ratchet plate, viewing Fig. 5, is limited by a sleeve 244 secured to the flanged portion of part 224 by a screw 246, and counter-clockwise rotation of said plate is limited by an adjustable stop 248 mounted on bottom wall 104. Plate 113 is moved counter-clockwise and biased for counter-clockwise rotation by a spring 250 secured thereto at 252 and to pin 190. Plate 113 is also provided with a downwardly extending pin 254 which operates a switch 256 when said plate is in its extreme counter-clockwise position, as illustrated in Fig. 8, the purpose of which is hereinafter described. The ratchet plate 113 is provided with five ratchet teeth T1, T2, T3, T4 and T5 which cooperate with the vertical portions 258 and 260 of the arcuate part 202 of cylindrical member 194, as hereinafter described, part 224 having a cutaway portion 225 so that pawl 208 can be positioned to engage the ratchet teeth.

Figure 9:
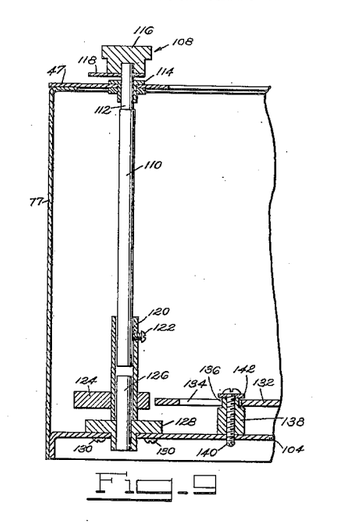
Fig. 9 is a sectional view on the line 9—9 of Fig. 4.

It will be understood that when knob 116 is turned so that indicator 118 points in the direction opposite that shown in Figs. 1 and 9, cam 124 engages link 132 and operates the latter and lever 148 whereby link 152 pivots lever 168 in a counter-clockwise direction viewing Fig. 8 to its projected position whereby pawl 208 is disengaged from the ratchet plate. In this position, bracket 44 is manually operable to rotate feed funnel 32, from its position shown in Fig. 1 in which position the ratchet plate abuts detent 246, in a counter-clockwise direction, viewing Fig. 1, to a position wherein outlet 34 is in registry with drain 74, in which latter position the ratchet plate, having been also rotated in a counter-clockwise direction abuts stop 248. It will be apparent that with the pawl and ratchet plate disengaged, outlet 34 may be positioned to fill the receptacles in any desired row. Assuming now that it is desired to fill each row of receptacles, bracket 44 is turned to the position shown in Fig. 1. Knob 116 is now turned until indicator 118 points to side wall 77 thereby indicating that cam 124 is positioned, as shown in Fig. 4, whereby the pawl unit 111 is in its retracted position and ratchet tooth T1 is intermediate pawl portions 258 and 260, tooth T2 abutting portion 260. We shall also assume that the outermost receptacle at the liquid filling station is positioned immediately behind pin 21 on rack plate 14, considering the rack to rotate a clockwise direction viewing Figs. 1 and 2. If desired, the rack may carry a suitable indication to show the position of pin 21. After the rack has made one complete rotation, as hereinafter described, to fill all the receptacles in the innermost row, pin 21 will be in the position illustrated in Fig. 5. As the rack continues to rotate in a clockwise direction, pin 21 moves against pawl arm 206 whereby the pawl is caused to rotate in a counter-clockwise direction about post 198 and assumes the position shown in Fig. 6 wherein pawl portion 260 having released tooth T2, spring 250 has caused the ratchet plate 113 to rotate in a counter-clockwise direction on shaft 222 until tooth T1 abuts pawl portion 258. As soon as pin 21 clears arm 206, the arm 204 is retracted by spring 210 into engagement with detent 211 thereby rotating the pawl in a clockwise direction and momentarily releasing the ratchet plate for counter-clockwise rotation by spring 250 until portion 260 abuts tooth T3 (Fig. 7). It will be noted that tooth T1 is now positioned beyond cylindrical part 194 and tooth T2 is positioned intermediate pawl portions 258 and 260. It will be apparent that the movement of the ratchet plate from the position shown in Fig. 5 to that shown in Fig. 7 has caused the lateral movement of funnel 32 from its position in which outlet 34 is in registry with the innermost receptacle row to a position in which outlet 34 is in registry with the adjacent row of receptacles. It will also be apparent that when tooth T1 is intermediate pawl portions 258 and 260, funnel 32 is positioned to fill the innermost receptacle row and when tooth T2 is intermediate said pawl portions, funnel 32 is positioned to fill the next outer row. It will be understood that the above described action of the pawl and the ratchet plate is repeated each time that pin 21 engages the pawl whereby outlet 34 is moved laterally, step-wise, into registry with each row until tooth T5 clears the pawl, as in Fig. 8, whereby the ratchet plate is rotated in a counter-clockwise direction by spring 250 until it abuts stop 248 which is adjusted so that outlet 34 registers with drain 74. In this position normally closed switch 256 is opened by pin 254 to automatically interrupt an electric circuit and thus terminate the operation of the apparatus, as hereinafter described.

It will be understood that if it is desired to fill less than the total number of receptacles, for example 100, control 108 is operated, as described to disengage the pawl and ratchet and outlet 34 is positioned in registry with the first receptacle behind pin 21 in the third row counting from the innermost row. Upon operating control 108 to move link 132, for releasing ratchet 113 from its control pawls, bracket 44 may then be freely moved, manually, to position the funnel outlet 34 at said third row and, upon return movement of knob 108 to its initial position, tooth T3 is automatically positioned between parts 258 and 260. If it is desired to include only a portion of any row in the filling operation, e. g. in filling 75 receptacles, funnel 32 is positioned as for filling 100, and the rack is manually rotated until the 26th receptacle behind pin 21 in said third row is in the liquid filling station. The apparatus is then operated in the ordinary manner. It will therefore be apparent that the apparatus can be adjusted to fill any desired number of receptacles.

The mechanism for intermittently rotating the rack will now be described with reference to Figs. 13 through 18. A motor 260 is mounted on a frame 262 bolted as at 264 to bottom wall 104 adjacent the corner formed by side wall 106 and side wall 266 of the housing, said motor having a worm 268 secured to the shaft 270. A bracket 272 is secured to said motor, as at 274, said bracket being provided with the horizontally spaced parts 276 and 278 provided with bushings 280 and 282, respectively, in which a vertically disposed shaft 284 is mounted for rotation. Said shaft is provided with a gear 286, said gear being spaced from bushings 280 and 282 by sleeves 288 and 290, respectively. Gear 286 is driven by worm 268 for rotating shaft 284, the lower end of said shaft being mounted in a gear 292 rotated thereby. A cam 294 is secured for rotation adjacent the free end of said shaft, said cam engaging a roller 296 carried by the operating part 297 of a normally closed switch 298, here shown as a micro-switch, although other types of switches may be used, said switch being carried by a bracket 300 secured to part 276. A gear 302 is mounted for rotation on a support 304 secured to bottom wall 104. Support 304 is provided with a vertical shaft 305 which extends into a collar 307 on the upper surface of gear 302, said collar having a recess 309. A screw 311 threaded into shaft 305 retains a washer 313 in recess 309 whereby gear 302 rotates on said shaft and is secured against vertical displacement. Gear 302 meshes with gear 292 and is driven thereby. Viewing Fig. 13, it will be understood that worm 268 drives gear 286 in a clockwise direction whereby shaft 284 is driven in a clockwise direction thereby rotating cam 294 and gear 292 in a clockwise direction, the latter driving gear 302 in a counter-clockwise direction, all as indicated by the arrows in said figure.

Figures 13, 14, 15, 16:
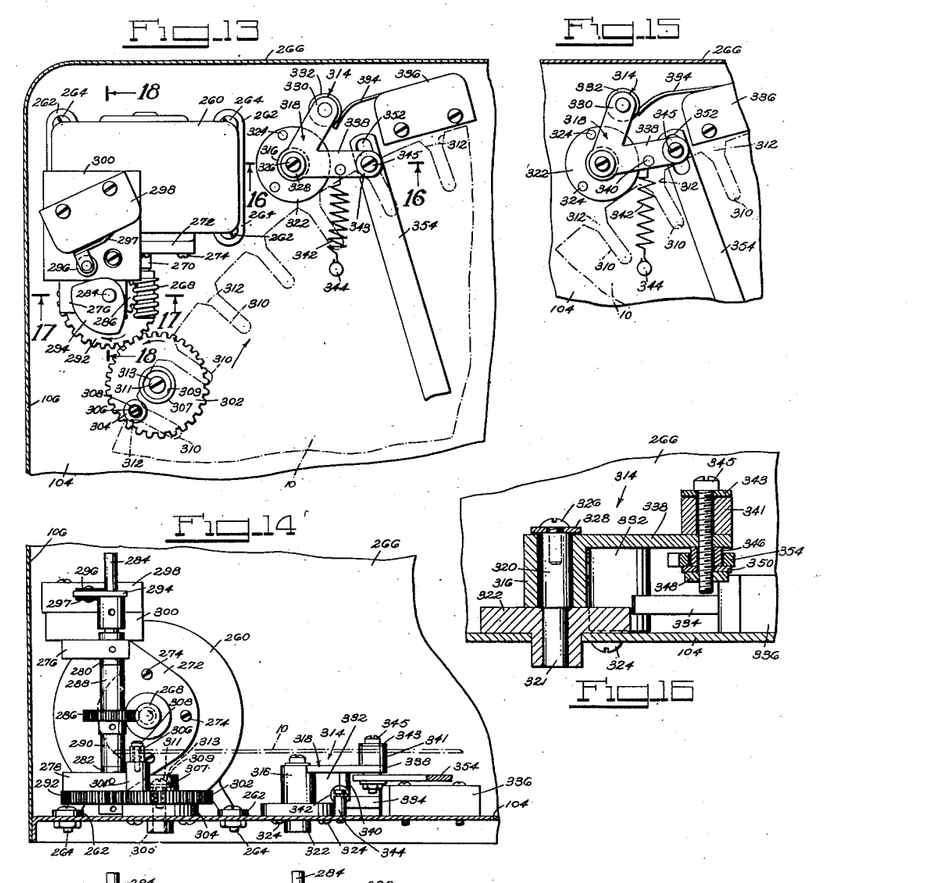
Fig. 13 is a plan view of another mechanism forming part of the apparatus.
Fig. 14 is a view in elevation of the mechanism shown in Fig. 13.
Fig. 15 is a fragmentary view of part of the mechanism shown in Fig. 13 and illustrating another operating position thereof.
Fig. 16 is a sectional view taken on line 16—16 of Fig. 13.
Figure 17:
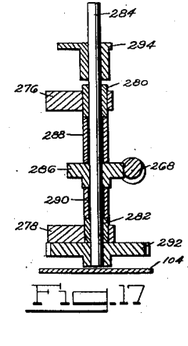
Fig. 17 is a sectional view taken on line 17—17 of Fig. 13.
Figure 18:
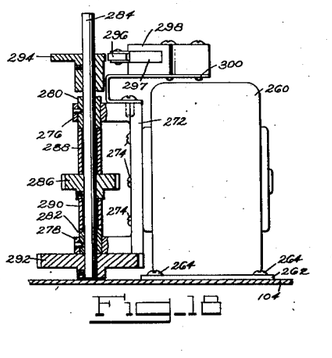
Fig. 18 is a sectional view taken on line 18—18 of Fig. 13.

Gear 302 is provided with the vertical pin 304 mounted adjacent the periphery thereof and a cylinder 306 is secured to the free end of said post by a screw 308, forming a rack-turning member. It will be noted from Fig. 14 that gear 302 is positioned below plate 14 of rack 10 so that cylinder 306 can enter the inwardly extending slots 310 in the periphery of plate 14, said slots being wider at the open end 312 thereof. It will be understood that as gear 302 is rotated, cylinder 306 enters portion 312 of one of the slots 310, as illustrated in Fig. 13, said cylinder being carried into the slot by the rotation of the gear and then being withdrawn by the continuous rotation of the gear after it reaches a point of maximum penetration into the slot, as is well understood, to rotate plate 14 in a clockwise direction, viewing said figure, thereby rotating the rack. It will be understood that the rack is rotated in an intermittent manner by gear 302 and cylinder 306, the rack being stationary for a predetermined time interval, as hereinafter described in detail, during which period a receptacle is charged by funnel 32 and the rack rotating one step after said receptacle is charged to position the succeeding receptacle at the charging station. It will be apparent that the quantity of liquid or other material supplied to each receptacle will be determined by the period of time during which each receptacle is at the charging station.

A mechanism 314 is provided for releasably holding rack 10 in stationary position, when the rack turning member 306 is disengaged from the rack, and for actuating a switch which together with switch 298 and a timer-operated switch controls the operation of motor 260. Mechanism 314 comprises a cylindrical part 316 having an integral V-shaped portion 318 extending horizontally from the top thereof. Said part is mounted for rotation on a stationary vertical shaft 320 which has a reduced portion 321 secured in a flanged support 322 affixed to bottom wall 104 as by screws 324. A screw 326, having a washer 328, is threaded into the free end of post 320 and secures cylinder 316 against vertical displacement. One arm 330, of part 318, is provided with a roller 332 which actuates the external operating part 334 of a switch 336, here shown as a micro-switch. The other arm 338 is provided with a downwardly extending pin 340 to which is secured one end of a spring 342, the other end of said spring being secured to a pin 344 mounted on bottom wall 104, said spring biasing cylinder 316 in a clockwise direction, viewing Fig. 15. At its outer end, arm 338 is provided with a detent in the form of rotatable cylindrical part or roller 341 secured thereto by a washer 343 and a screw 345. Said part 341 is engageable in flaring portion 312 of slots 310 of rack plate 14, said plate being in a plane elevated above every part of assembly 314, except said part. A sleeve 346 is mounted on screw 345 by a nut 348 and a washer 350, said sleeve abutting the underside of arm 338 and being movably disposed in an axial slot 352 at the free end of link 354, the other end of said link being secured by pivot screw 144 to link 132 and the end 146 of lever 148. It will be apparent that when control knob 116 is operated to cam link arm 132, link arm 354 will be carried to a retracted position thereby carrying detent 341 beyond the periphery of rack plate 14, said rack now being freely manually rotatable in either direction, provided cylinder 306 is also beyond the periphery of plate 14, for positioning the rack to fill a predetermined number of receptacles, as previously described.

When link 354 is in its normal operating position, lever 148 being in the position illustrated in Fig. 4, spring 342 biases detent 341 into slot portions 312, as illustrated in Fig. 13, during those intervals when said detent is not riding on the arcuate peripheral portions of plate 14, as illustrated in Fig. 15. It will also be apparent from Fig. 13 that when detent 341 is in a slot portion 312, the part 316 has been rotated in a clockwise direction whereby roller 332 operates the external operating member 334 of switch 336.

Figure 19:
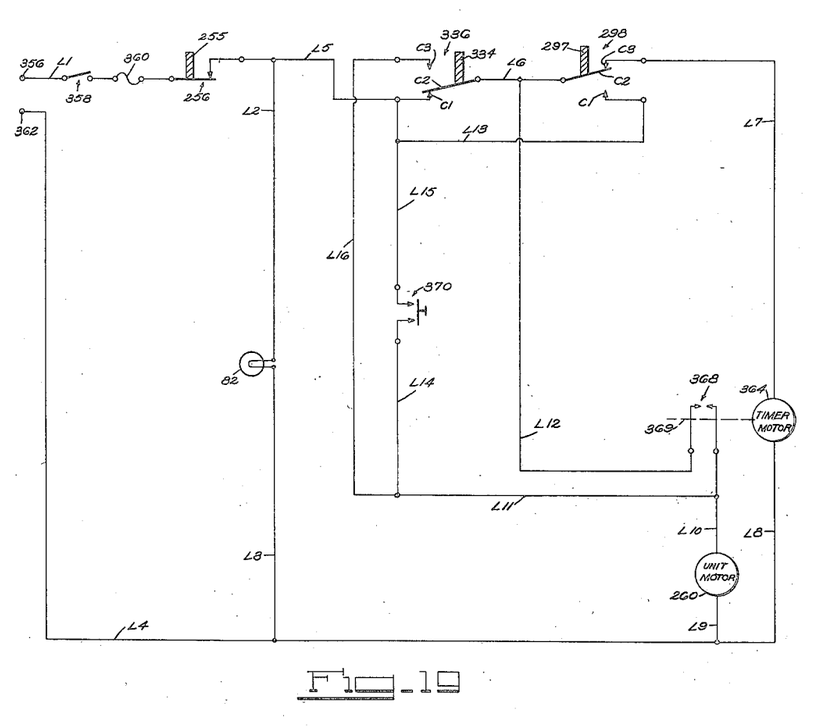
Fig. 19 is a circuit diagram of the electrical devices of the apparatus.

A wiring diagram of the equipment is illustrated in Fig. 19. From power input terminal 356, which connects to a suitable power source, wire L1 is connected to the main manually controlled switch 358, mounted on housing 24, and extends through fuse 360 to one contact of the normally closed automatic shut-off switch 256, here shown as a micro-switch, although other types of switches may be used. From switch 256, a wire L2 is connected to the light 82 and a wire L3 runs from said light to a lead L4 which runs to terminal 362 which connects to the power source. From switch 256, a wire L5 extends to a stationary contact C1 of the switch 336, here shown as a micro-switch, it being understood that other types of switches may be used in place of a micro-switch. Contact C1 is normally engaged by movable contact C2. Movable contact C2 of switch 336 is connected by wire L6 to the movable contact C2 of rack drive cam switch 298, here shown as a micro-switch, it being understood that other switch types may be used. Contact C2 of the latter switch is normally engaged with the stationary contact C3 thereof. From contact C3 of the latter switch, a wire L7 connects to the electric clock motor of a timing device or counter 364, the controls 366 of which are mounted on the upper wall 47 of the housing. The timing device or counter may be of any suitable type, and is readily available on the market, and since it is not in itself part of the present invention, it is not herein described specifically or further illustrated, but certain parts thereof are hereinafter referred to in explaining the operation of the apparatus. The counter or timing device utilized in the present apparatus, as actually constructed and operated, is an automatic reset counter of a well known type wherein the manual control and indicator 366 may be adjusted to operate the timer motor for a predetermined time interval, the control during its movement to zero position indicating the elapsed period of operation during the operating-cycle of the motor and automatically resetting itself at the end of each operating cycle. From the timer 364 a wire L8 is connected to wire L4 which extends to terminal 362. It will be apparent that the timer is connected to the power input terminals through the described circuit.

The rack-drive motor 260 is connected to lead L4 by wire L9 and by wires L10, L11 and L16 to the stationary contact C3 of switch 336. Motor 260 is also connected by wire L10 to one contact of the timer controlled switch 368 the other contact of which is connected by wire L12 to wire L6. It will be understood that switch 368 is operated by the mechanism of the timer as indicated diagrammatically at 369, the contacts of said switch being closed by the timer motor at the end of the predetermined time setting and then opened again when the timer is reset by an interruption of power to the timer motor. A wire L13 connects the stationary contact C1 of switch 298 to the stationary contact C1 of switch 336. A manually operated momentary reset switch 370, mounted on the housing 24, is connected by wires L14 and L15 between wires L5 and L11 for momentarily energizing motor 260 independently of timer 364 when required, as hereinafter described.

The operation of the apparatus will now be described with reference to the wiring diagram. The control knob 116 having been operated, as described, to permit the manual adjustment of the rack and of bracket 44, and assuming that the latter has been positioned, as illustrated in Fig. 1 so that outlet or dropper 34 is in registry with one of the receptacles in the innermost row, which we shall assume is the first receptacle positioned rearwardly of rack pin 21, as described above, said control knob having been returned to its initial position in which the rack plate 14 is engaged by detent 341, and the timer 364 having been set as desired, switch 358 is closed. This connects the timer motor to the power supply as follows: from terminal 356 over wire L1 through the normally closed switch 256, through wire L5, through the contacts C1 and C2 of switch 336 which are engaged when detent 341 is positioned in the rack slot, over wire L6, through the normally engaged contacts C2 and C3 of switch 298, over wire L7 to the motor of timer 364, and from the timer motor by way of wires L8 and L4 to terminal 362. As the timer switch 368 remains open according to the setting of timing control 366, and as said switch controls the circuit of rack-drive motor 260, the latter does not operate and rack 10 remains stationary until said switch is closed at which time the circuit of motor 260 is completed as follows: from terminal 356, through switches 38 and 256, wire L5, through the engaged contacts C1 and C2 of switch 336, wires L6 and L12, switch 368 (now closed) and wire L10 to one side of motor 260 and from the other side of the motor by wires L9 and L4 to input terminal 362. This completed circuit causes the motor to operate thereby causing worm 268 to drive gear 286 for driving shaft 284, which rotates gear 292 to drive gear 302 whereby part 306 enters slot 310 and rotates the rack in the direction of the arrow thereon in Fig. 13. Very shortly after the rack begins to turn, cam 294 engages roller 296 of the switch operating member 297 of the rack-drive switch 298 and moves contact C2 out of engagement with contact C3 and into engagement with contact C1, thus breaking the circuit to the motor of the timer 364. As soon as the timer motor circuit is interrupted, the timer controlled switch opens but in the meantime, due to the turning of the rack, detent 341 is caused to move out of slot portion 312 to the peripheral edge portion of the rack between successive slots 310 and thereby actuates the operating member 334 of switch 336 to disengage contacts C1 and C2 and to engage contacts C2 and C3, thus maintaining the circuit of the rack-drive motor 260 closed. More particularly, this circuit is completed by wires L11 and L16 to contacts C3—C2 of switch 336, wire L6, contacts C2—C1 of switch 298, and wire L13 which is connected to wire L5. Cam 294 disengages operating member 297 of switch 298 before the step movement of the rack is completed but the rack continues to move, by reason of the inertia of the rack and the associated mechanism, until detent 341 enters the next notch or slot portion 312 at which time the rack comes to rest and the circuit of the timer motor 364 is again completed and the timer again operates for the next charging interval. An adjustable friction-brake (not shown) may be provided, if necessary, to oppose the inertia of the rack and bring it to a stop when detent 341 enters the notch or slotted portion 312 of the rack at the end of the step motion of the rack as just described. It will be noted also that the inertia of the movable motor-operated parts which actuate cam 294 is such in relation to inherent friction or to friction which may be applied, as by means of a friction brake (not shown), that said cam and the inter-geared motor operated parts return to the correct starting position so that the cycle of operations is repeated each time under the control of the timer.

If for any reason, the inertia is insufficient to rotate the motor shaft to return the cam to the correct position in relation to switch 298, the momentary reset switch 370 may be manually operated to complete a circuit for motor 260 through wires L10, L11, L14, L15 and L5 to operate the motor until the cam is in the correct position to engage the switch. It will be understood that reset switch 370 will normally be used only when adjusting the equipment for proper operation and not during the normal operation of the equipment.

It will be noted that at the completion of the described operating cycle, switches 336 and 298 are in the originally described circuit condition to connect the timer to the power source and that the rack has moved one step in a clockwise direction to position the next receptacle in the liquid filling station when the timer motor is again connected to the power supply.

The manner in which pin 21 operates the pawl and ratchet devices to cause the lateral movement of funnel 32 has been described above. After tooth T5 has cleared the pawl, and the ratchet plate is in its fully retracted position, as in Fig. 8, pin 254 carried thereby engages the operating member 255 of normally closed switch 256 to open said switch and stop the apparatus, it being apparent that this takes place when the last receptacle has been charged.

It will be observed that the apparatus of the present invention is operable to supply an accurately measured quantity of liquid or other material to each of a predetermined large number of receptacles, without requiring the attention or presence of an attendant. Thus, for example, once the operation of the apparatus has been initiated, it may be left operating, overnight if necessary, until all of the selected number of receptacles are supplied with liquid at which time the operation is automatically terminated.

Various changes in and additions to the apparatus hereinbefore described may be made. For example, the drop-counter and controls shown in my prior applications may be provided in the present apparatus in lieu of the timer 364. Further, it will be understood that a plurality of liquid supply means and companion funnels, respectively, may be provided so that two or more sets of receptacles may be charged at the same time with the same or different liquids supplied to each set, thus decreasing the time required for charging all the receptacles, to the full capacity of the rack when the liquid is the same, or enabling different liquids to be collected in different sets of receptacles according to particular processing requirements. In this connection it will be observed that as indicated by Fig. 1A two or more funnels 32 can be mounted on a single bracket 44 beneath two outlets 30 of companion tubes 54, or other supplies and that without any other modification of the apparatus the latter can be operated to charge the receptacles in different rows. As shown in Fig. 1A, a plate 371 is attachable to bracket 44 by screws 373 and carries clips 40A and 40B for holding two funnels. It will be noted that plate 371 is provided with cutouts 375 to clear clips 40 which are attached directly to bracket 44. The inlet to drain 74 may be made large enough to receive the liquids from both funnels when bracket 44 is moved to its retracted position. As shown in Fig. 1A, two funnels 32 can be mounted in clips 40A—40A, and 40B—40B, with their outlets 34 positioned over receptacles in alternate rows, specifically so that one funnel will charge the receptacles of the first and second rows, considering the innermost row as the first row, and the second funnel will charge the receptacles of the third and fourth rows. Thus, while the receptacles in the first row are being charged by one funnel, the receptacles in the third row are being charged by the second funnel, and when the funnel holder has been moved one step to position the funnels over the second and fourth rows, the receptacles in these two rows are charged simultaneously by the two funnels, respectively. Likewise, it will be understood that there may be as many funnels as there are rows of receptacles so that the receptacles of all four rows may be charged simultaneously, i.e., during not more than one revolution of the rack. When two funnels are used as described above, the movement of shaft 222 which turns the bracket is placed under the control of the ratchet device with teeth T3 and T4 of ratchet member 113 complemental to pawl device 208 whereby the operation of the apparatus is terminated when rack pin 21 engages the pawl arm 206 the second time.

Also it will be understood that various devices may be used instead of droppers for supplying liquid or other material in predetermined volume to the receptacles. For example, valve controlled outlets may be provided for supplying material to the funnel or funnels, as the case may be, the outlets of the funnels being free-flowing outlets rather than drop-flow outlets; or any other suitable dispensing means, such as a dispensing pump for example may be employed with free-flowing funnels for directing the substances to the receptacles in one or more rows.

Accordingly, it will be understood that the above mentioned and various other changes in the form and arrangement of parts as well as in details of construction may be made without departing from the underlying idea or principles of this invention within the scope of the appended claims.

Having thus described my invention, what I claim and desire to secure by Letters Patent, is:

1. Apparatus of the character described, comprising a movable device having a material supply passage, supporting means including a support and a rack movably mounted on said support and provided with means arranged in each of a plurality of laterally related circular rows supporting a plurality of receptacles in each of said laterally related circular rows, means for moving said rack in relation to the outlet of said passage for presenting the receptacles in succession at a position to be supplied with material issuing from said outlet, and means operated by said supporting means for automatically moving said movable device in lateral steps corresponding to the distance between said receptacle rows, whereby to position said device in material-supplying relation to the receptacles of one of said rows following the supply of material to the receptacles of another of said rows, said rack being removable as a unit from said support and replaceable as a unit thereon.

2. Apparatus of the character described, comprising a movable device having a material supply passage, supporting means including a support and a rack movably mounted on said support and provided with means arranged in each of a plurality of laterally related circular rows supporting a plurality of receptacles in each of said laterally related circular rows, means for moving said rack in relation to the outlet of said passage for presenting the receptacles in succession at a position to be supplied with material issuing from said outlet, and means operated by said supporting means for moving said movable device laterally of said receptacle rows, whereby to position said device in material-supplying relation to the receptacles of one of said rows following the supply of material to the receptacles of another of said rows, said rack being removable as a unit from said support and replaceable as a unit thereon, said last mentioned moving means including a member movable in lateral steps corresponding to the distance between said laterally related rows, said movable device being in operative engagement with said member.

3. Apparatus of the character described, comprising a movable device having a material supply passage, means for supporting a plurality of receptacles in a plurality of laterally related rows, means for moving said supporting means in relation to the outlet of said passage for presenting the receptacles in succession at a position to be supplied with material issuing from said outlet, means operated by said supporting means for moving said movable device laterally of said receptacle rows, whereby to position said device in material-supplying relation to the receptacles of one of said rows following the supply of material to the receptacles of another of said rows, said last mentioned moving means including a member movable in lateral steps corresponding to the distance between said laterally related rows, said movable device being in operative engagement with said member, and means operated by said member at the termination of its movement to terminate the movement of said supporting means, said movable device being positioned at said termination, relative to said supporting means, whereby said outlet is clear of said receptacles.

4. Apparatus of the character described, comprising a movable device having a material supply passage, means for supporting a plurality of receptacles in a plurality of laterally related rows, means for moving said supporting means in relation to the outlet of said passage for presenting the receptacles in succession at a position to be supplied with material issuing from said outlet, means operated by said supporting means for moving said movable device laterally of said receptable rows, whereby to position said device in material-supplying relation to the receptacles of one of said rows following the supply of material to the receptacles of another of said rows, said last mentioned moving means including a member movable in lateral steps corresponding to the distance between said laterally related rows, said movable device being in operative engagement with said member, and means operated by said member at the termination of its movement to terminate the movement of said supporting means, said movable device being positioned at said termination, relative to said supporting means, whereby said outlet is clear of said receptacles, said means operated by said member comprising switch means in circuit with said support-moving means, said member having a part engageable with said switch at the termination of its movement.

5. Apparatus of the character described, comprising a movable device having a material supply passage, means for supporting a plurality of receptacles in a plurality of laterally related rows, means for moving said supporting means stepwise in relation to the outlet of said passage for presenting the receptacles in succession at a position to be supplied with material issuing from said outlet, and means operated in response to a predetermined step-wise movement of said supporting means for moving said movable device positively and laterally of said receptacle rows, whereby to position said device in material-supplying relation to the receptacles of one of said rows following the supply of material to the receptacles of another of said rows, said last mentioned moving means comprising engageable pawl and ratchet means and said ratchet means being movable in lateral steps corresponding to the distance between said laterally related rows, said ratchet means being in operative engagement with said movable device to effect said positive movement thereof.

6. Apparatus of the character described, comprising a movable device having a material supply passage, means for supporting a plurality of receptacles in a plurality of laterally related rows, means for moving said supporting means stepwise in relation to the outlet of said passage for presenting the receptacles in succession at a position to be supplied with material issuing from said outlet, and means operated in response to a predetermined step-wise movement of said supporting means for moving said movable device positively and laterally of said receptacle rows, whereby to position said device in material-supplying relation to the receptacles of one of said rows following the supply of material to the receptacles of another of said rows, said last mentioned moving means comprising engageable pawl and ratchet means and said ratchet means being movable in lateral steps corresponding to the distance between said laterally related rows, said ratchet means being in operative engagement with said movable device to effect said positive movement thereof, and means for disengaging said pawl means from said ratchet means for adjustably positioning said device.

7. Apparatus of the character described, comprising a movable device having a material supply passage, means for supporting a plurality of receptacles in a plurality of laterally related rows, means for moving said supporting means step-wise in relation to the outlet of said passage for presenting the receptacles in succession at a position to be supplied with material issuing from said outlet, and means operated in response to a predetermined step-wise movement of said supporting means for moving said movable device laterally of said receptacle rows, whereby to position said device in material-supplying relation to the receptacles of one of said rows following the supply of material to the receptacles of another of said rows, said last mentioned moving means comprising engageable pawl and ratchet means and said ratchet means being movable in lateral steps corresponding to the distance between said laterally related rows, and means for disengaging said pawl means from said ratchet means for adjustably positioning said device comprising a link assembly having a movable link connecting member and a link connected between said connecting member and said pawl means for moving the latter to a projected position upon the movement of said connecting member, and spring means biasing said ratchet means for movement in a direction to disengage said pawl means.

8. Apparatus of the character described, comprising a movable device having a material supply passage, means for supporting a plurality of receptacles in a plurality of laterally related rows, means for moving said supporting means in relation to the outlet of said passage for presenting the receptacles in succession at a position to be supplied with material issuing from said outlet, and means operated by said supporting means for moving said movable device laterally of said receptacle rows, whereby to position said device in material-supplying relation to the receptacles of one of said rows following the supply of material to the receptacles of another of said rows, said last mentioned moving means comprising engageable pawl and ratchet means, said pawl means being engaged by said supporting means at a predetermined point in the movement thereof for moving said ratchet means, said ratchet means being movable in lateral steps corresponding to the distance between said laterally related rows, said movable device being in operative engagement with said ratchet means, and means for disengaging said pawl means from said ratchet means for adjustably positioning said device comprising a link assembly having a link connecting member, a first link arm secured to said member for pivotally moving the latter and a second link arm connected between said member and said pawl means for moving the latter to a projected position upon the movement of said connecting member, and spring means biasing said ratchet means for movement in a direction to disengage said pawl means.

9. Apparatus of the character described, comprising a movable device having a material supply passage, means for supporting a plurality of receptacles in a plurality of laterally related rows, means for moving said supporting means stepwise in relation to the outlet of said passage for presenting the receptacles in succession at a position to be supplied with material issuing from said outlet, and means operated in response to a predetermined step-wise movement of said supporting means for moving said movable device laterally of said receptacle rows, whereby to position said device in material-supplying relation to the receptacles of one of said rows following the supply of material to the receptacles of another of said rows, said last mentioned moving means comprising a pawl biased for turning in one direction and a ratchet biased for turning in an opposite direction and operatively connected to said movable device for moving the latter.

10. Apparatus of the character described, comprising movable means for supporting a plurality of receptacles in a row extending in the direction of movement of the supporting means, means for mounting a material supply device in position at a receptacle-charging station, means for moving said supporting means step by step to carry said receptacles in succession to said station to receive a charge of material from said supply device, a motor for actuating said moving means, said moving means including a part moving in a predetermined circular path and directly engaging said supporting means intermittently for moving said supporting means one step at a time during each of said engagements, and releasable means automatically holding said supporting means against movement between said engagements.

11. Apparatus of the character described, comprising movable means for supporting a plurality of receptacles in a row extending in the direction of movement of the supporting means, means for mounting a material supply device in position at a receptacle-charging station, means for moving said supporting means step by step to carry said receptacles in succession to said station to receive a charge of material from said supply device, a motor for actuating said moving means, said moving means including a part moving in a predetermined path and directly engaging said supporting means intermittently for moving said supporting means one step at a time, during each of said engagements, and timing means for controlling the operations of said motor whereby to predetermine the duration of rest intervals of said supporting means between the successive step movements thereof.

12. Apparatus of the character described, comprising movable means for supporting a plurality of receptacles in a row extending in the direction of movement of the supporting means, means for mounting a material supply device in position at a receptacle-charging station, means for moving said supporting means step by step to carry said receptacles in succession to said station to receive a charge of material from said supply device, a motor for actuating said moving means, said moving means including a part directly engaging said supporting means intermittently for moving said supporting means one step at a time, during each of said engagements, means releasably engageable with said supporting means for releasably holding the latter stationary between said engagements, switch means for controlling said motor, and timing means for controlling said switch means for controlling the operations of said motor whereby to predetermine the duration of rest intervals of said supporting means between the successive step movements thereof.

13. Apparatus of the character described, comprising container-supporting means mounted for turning movement about a vertical axis and constructed and arranged to carry a plurality of containers in each of a plurality of circular rows, means for intermittently turning said container supporting means for presenting said containers in succession at a material receiving station, means at said station for mounting means to supply the material successively to said containers of one of said rows, said supply mounting means being movable from a position above said one of the rows to another position above another of said rows, and means carried directly by said container-supporting means for moving said supply mounting means from said first mentioned position thereof to said other position thereof at a predetermined point in the turning of said container-supporting means, said directly carried means being normally free of engagement with said mounting means and in operative engagement therewith at said predetermined point.

14. Apparatus of the character described, comprising container-supporting means mounted for turning movement about a vertical axis and constructed and arranged to carry a plurality of containers in each of a plurality of circular rows, means for intermittently turning said container supporting means for presenting said containers in succession at a material receiving station, means at said station for mounting means to supply the material successively to said containers of one of said rows, said supply mounting means being movable from a position above said one of the rows to another position above another of said rows, means operated by said container-supporting means for moving said supply means from said first mentioned position thereof to said other position thereof at a predetermined point in said rotation thereof, and means operable in response to a predetermined number of movements of said container-supporting means to discontinue the operation of said turning means.

15. Apparatus of the character described, comprising container-supporting means mounted for turning movements about a vertical axis and constructed and arranged to carry a plurality of containers in each of a plurality of radially related circular rows, means for intermittently turning said container-supporting means for presenting said containers in succession at a material receiving station, means at said station for mounting means to supply the material successively to said containers of one of said rows, said supply-mounting means being movable from a position above said one of the rows to another position above another of said rows, and means including a pawl and ratchet mechanism actuated by said container-supporting means and operatively connected to said supply means for positively moving the latter from said first mentioned position thereof to said other position thereof at a predetermined point in said rotation thereof.

16. Apparatus of the character described, comprising container-supporting means mounted for turning about a vertical axis and constructed and arranged to carry a plurality of containers in each of a plurality of radially related circular rows, means for intermittently turning said container-supporting means for presenting said containers in succession at a material receiving station, means at said station for mounting means to supply the material successively to said containers of one of said rows, said supply-mounting means being movable from a position above said one of the rows to another position above another of said rows, means including a pawl and ratchet mechanism actuated by said container-supporting means and operatively connected to said supply means for moving the latter from said first mentioned position thereof to said other position thereof at a predetermined point in said rotation thereof, and means having an operating part accessible externally of said apparatus for disengaging said pawl and ratchet mechanism whereby said supply means is manually adjustable.

17. Apparatus of the character described, comprising container-supporting means mounted for turning movement about a vertical axis and constructed and arranged to carry a plurality of containers in each of a plurality of radially related circular rows, means for intermittently turning said container-supporting means for presenting said containers in succession at a material receiving station, means at said station for mounting means to supply the material successively to said containers of one of said rows, said supply-mounting means being movable from a position above said one of the rows to another position above another of said rows, and means operated by said container-supporting means for moving said supply means from said first mentioned position thereof to said other position thereof at a predetermined point in said rotation thereof, said turing means including an electric motor, a part mounted for rotation by said motor, said part intermittently engaging said container-supporting means, and means releasably engageable with said container-supporting means in predetermined relation thereto for releasably preventing free turning movements thereof when disengaged by said part of the turning means.

18. Apparatus of the character described, comprising container-supporting means mounted for turning movement about a vertical axis and constructed and arranged to carry a plurality of containers, in each of a plurality of radially related circular rows, means for intermittently turning said container-supporting means for presenting said containers in succession at a material receiving station, means at said station for mounting means to supply the material successively to said containers of one of said rows, said supply-mounting means being movable from a position above said one of the rows to another position above another of said rows, means operable in response to a predetermined number of turning-movements of said container-supporting means for moving said supply-mounting means from said first mentioned position thereof to said other position thereof, said container-supporting means having radially slotted portions at the periphery thereof, said turning means including a part mounted for rotation and intermittently engaging said container-supporting means in said slotted portion thereof and means releasably engageable with said slotted portions of releasably restraining said container- supporting means against turning when disengaged by said part of the turning means.

19. Apparatus of the character described, comprising a frame, a receptacle-support movably mounted on said frame and having means for carrying a plurality of receptacles in position in each of a plurality of laterally related circular rows extending in the direction of movement of said support, said receptacle-support being removable as a unit from said frame and replaceable as a unit thereon, means for supporting a material-supply device in relation to said receptacle-support, a device mounted for movement relative to said receptacle-support and the material-supply device for receiving material from said supply device and for directing the material to the receptacles in succession in each of said rows, respectively, means for moving said receptacle-support in relation to said directing means to present the receptacles in succession to the outlet of the latter, and means automatically operable in response to a predetermined movement of said receptacle support and operatively connected to said directing means for positively moving the latter laterally of said receptacle rows so that the receptacles of one row are presented to said directing means following the presentation of the receptacles of another of said rows to said directing means.

20. Apparatus of the character described, comprising a frame, a receptacle-support movably mounted on said frame and having means for carrying a plurality of receptacles in position in each of a plurality of laterally related circular rows extending in the direction of movement of said support, said receptacle-support being removable as a unit from said frame and replaceable as a unit thereon, means for supporting a material-supply device in relation to said receptacle-suport, a device mounted for movement relative to said receptacle-support and the material-supply device for supporting a directing means for receiving material from said supply device and directing it to the receptacles in succession in each of said rows, respectively, means for moving said receptacle-support in relation to said directing means to present the receptacles in succession to the outlet of the latter, and means automatically operable in response to a predetermined movement of said receptacle support and operatively connected to said supporting device for the directing means for positively moving the latter laterally of said receptacle rows so that the receptacles of one row are presented to said directing means following the presentation of the receptacles of another of said rows to said directing means.

21. Apparatus of the character described, comprising a frame, a receptacle-support movably mounted on said frame and having means for carrying a plurality of receptacles in position in each of a plurality of laterally related circular rows extending in the direction of movement of said support, said receptacle-support being removable as a unit from said frame and replaceable as a unit thereon, means for supporting a material-supply device in relation to said receptacle-support, a device mounted for movement relative to said receptacle-support and the material-supply device for supporting a directing means for receiving material from said supply device and directing it to the receptacles in succession in each of said rows, respectively, means for moving said receptacle-support in relation to said directing means to present the receptacles in succession to the outlet of the latter, and means automatically operable in response to a predetermined movement of said receptacle support and operatively connected to said supporting device for the directing means for positively moving the latter laterally of said receptacle rows so that the receptacles of one row are presented to said directing means following the presentation of the receptacles of another of said rows to said directing means, said last mentioned means including releasable means for holding said support for the directing means in stationary position until moved by said moving means.

22. Apparatus of the character described, comprising a frame, a receptacle-support movably mounted on said frame and having means for carrying a plurality of receptacles in position in each of a plurality of laterally related rows extending in the direction of movement of said support, means for supporting a material-supply device in relation to said receptacle-support, a device mounted for movement relative to said receptacle-support and the material-supply device for supporting a directing means for receiving material from said supply device and directing it to the receptacles in succession in each of said rows, respectively, means for moving said receptacle-support in relation to said directing means to present the receptacles in succession to the outlet of the latter, and means automatically operable in response to a predetermined movement of said receptacle support and operatively connected to said supporting device for the directing means for moving the latter laterally of said receptacle rows so that the receptacles of one row are presented to said directing means following the presentation of the receptacles of another of said rows to said directing means, said last mentioned means including releasable means for holding said support for the directing means in stationary position until moved by said moving means, and manually operable means for releasing said releasable means so that said support for the directing means can be moved manually to a predetermined position relatively to said receptacle rows.

23. Apparatus of the character described comprising a frame, a receptacle-support movably mounted on said frame and having means for carrying a plurality of receptacles in position in each of a plurality of laterally related rows extending in the direction of movement of said support, means for supporting a material-supply device in relation to said receptacle-support, a device mounted for movement relative to said receptacle-support and the material-supply device for supporting a directing means for receiving material from said supply device and directing it to the receptacles in succession in each of said rows, respectively, means for moving said receptacle-support in relation to said directing means to present the receptacles in succession to the outlet of the latter, and means automatically operable in response to a predetermined movement of said receptacle support and operatively connected to said supporting device for the directing means for moving the latter laterally of said receptacle rows so that the receptacles of one row are presented to said directing means following the presentation of the receptacles of another of said rows to said directing means, said means for turning said support for the directing means including means operated directly by said receptacle-support and pawl and ratchet means operable by said directly operated means.

24. Apparatus of the character described, comprising a frame, a receptacle-support movably mounted on said frame and having means for carrying a plurality of receptacles in position in each of a plurality of laterally related rows extending in the direction of movement of said support, means for supporting a material-supply device in relation to said receptacle-support, a device mounted for movement relative to said receptacle-support and the material-supply device for supporting a directing means for receiving material from said supply device and directing it to the receptacles in succession in each of said rows, respectively, means for moving said receptacle-support in relation to said directing means to present the receptacles in succession to the outlet of the latter, and means automatically operable in response to a predetermined movement of said receptacle support and operatively connected to said supporting device for the directing means for moving the latter laterally of said receptacle rows so that the receptacles of one row are presented to said directing means following the presentation of the receptacles of another of said rows to said directing means, said last mentioned means including releasable means for holding said support for the directing means in stationary position until moved by said moving means, and manually operable means for releasing said releasable means so that said support for the directing means can be moved manually to a predetermined position relatively to said receptacle rows, said means for turning said support for the directing means including means operated directly by said receptacle-support and pawl and ratchet means operable by said directly operated means.

25. An automatic sampler for taking samples of liquid comprising in combination a rotatable circular framework provided with a plurality of concentric circles of openings adapted to receive sample containers, the openings being uniformly angularly spaced about the periphery of each circle, the openings in the different circles being so spaced that the corresponding openings in the various circles are arranged about an arc of a circle convex in the direction of movement of the framework, timing means, means operable under the control of said timing means for rotating the framework intermittently at predetermined intervals, the angular movement being equal to the spacing of the openings in each circle, a pivoted filler tube adapted to register with successive openings and pivoted about the center of the circle on which the corresponding openings in the different circles are arranged, and means carried by the framework adapted to engage the filler tube after filling of the last hole of any circle and on the next intermittent rotation of the framework to deflect the filler tube to the next hole of the adjacent circle.

26. A device according to claim 25 in which the framework is provided with teeth on its periphery and a periodically actuated escapement is provided registering with said tooth periphery and adapted on actuation to permit step by step movement thereof, the teeth having the same angular spacing as the openings in the framework.

27. An automatic sampler for taking samples of liquid comprising in combination a rotatable circular framework provided with a plurality of concentric circles of openings adapted to receive sample containers, the openings being uniformly angularly spaced about the periphery of each circle, the openings in the different circles being so spaced that the corresponding openings in the various circles are arranged about an arc of a circle, timing means, means operable under the control of said timing means for rotating the framework intermittently at predetermined intervals, the angular movement being equal to the spacing of the openings in each circle, a pivoted filler tube adapted to register with successive openings and pivoted about the center of the circle on which the corresponding openings in the different circles are arranged, means carried by the framework adapted to engage the filler tube after filling of the last hole of any circle and on the next intermittent rotation of the framework to deflect the filler tube to the next hole of the adjacent circle.

28. Apparatus of the character described, comprising a movable device having a material supply passage, supporting means including a support and a rack movably mounted on said support and provided with means arranged in each of a plurality of laterally related circular rows supporting a plurality of receptacles in each of said laterally related circular rows, means for moving said rack in relation to the outlet of said passage for presenting the receptacles in succession at a position to be supplied with material issuing from said outlet, and means operated by said supporting means for automatically moving said movable device laterally of said receptacle rows, whereby to position said device in material-supplying relation to the receptacles of one of said rows following the supply of material to the receptacles of another of said rows, said rack being removable as a unit from said support and replaceable as a unit thereon, said rack and said means for moving the rack having releasable interengaging means forming a driving connection between said rack-moving means and said rack when the latter is positioned on said support.

29. An automatic sampler for taking samples of liquid comprising in combination a rotatable circular framework provided with a plurality of concentric circles of openings adapted to receive sample containers, the openings being uniformly angularly spaced about the periphery of each circle, the openings in the different circles being so spaced that the corresponding openings in the various circles are arranged about an arc of a circle convex in the direction of movement of the framework, means for rotating the framework intermittently at predetermined intervals the angular movement being equal to the spacing of the openings in each circle, a pivoted filler tube adapted to register with successive openings and pivoted about the center of the circle on which the corresponding openings in the different circles are arranged, means carried by the framework adapted to engage the filler tube after filling of the last hole of any circle and on the next intermittent rotation of the framework to deflect the filler tube to the next hole of the adjacent circle, said framework having means releasably engageable with said rotating means providing a releasable driving connection between said rotating means and said framework whereby the latter is disengageable as a unit from said rotating means.

30. An automatic sampler for taking samples of liquid comprising in combination a rotatable circular framework provided with a plurality of concentric circles of openings adapted to receive sample containers, the openings being uniformly angularly spaced about the periphery of each circle, the openings in the different circles being so spaced that the corresponding openings in the various circles are arranged about an arc of a circle convex in the direction of movement of the framework, timing means, means operable under the control of said timing means for rotating the framework intermittently at predetermined intervals, the angular movement being equal to the spacing of the openings in each circle, a pivoted filler tube adapted to register with successive openings and pivoted about the center of the circle on which the corresponding openings in the different circles are arranged, and means operable under the control of said framework to deflect the filler tube from the last hole of one circle to the next hole of the adjacent circle.

31. An automatic sampler for taking samples of liquid comprising in combination a rotatable circular framework provided with a plurality of concentric circles of openings adapted to receive sample containers, the openings being uniformly angularly spaced about the periphery of each circle, the openings in the different circles being so spaced that the corresponding openings in the various circles are arranged about an arc of a circle convex in the direction of movement of the framework, means for rotating the framework intermittently at predetermined intervals the angular movement being equal to the spacing of the openings in each circle, a pivoted filler tube adapted to register with successive openings and pivoted about the center of the circle on which the corresponding openings in the different circles are arranged, means carried by the framework adapted to engage the filler tube after filling of the last hole of any circle and on the next intermittent rotation of the framework to deflect the filler tube to the next hole of the adjacent circle, said framework having means releasably engageable with said rotating means providing a releasable driving connection between said rotating means and said framework whereby the latter is disengageable as a unit from said rotating means, and means operable under the control of said framework to deflect the filler tube from the last hole of one circle to the next hole of the adjacent circle.

32. Apparatus of the character described comprising a movable device having a material supply passage, means for supporting a plurality of receptacles in each of a plurality of laterally related rows, means for moving said receptacle-supporting means in relation to the outlet of said passage to present the receptacles in each row successively to said movable device, and means for moving said movable device laterally of said receptacle rows to positions for supplying material to the receptacles therein, respectively, said latter means comprising a column mounted for turning movement, said device being carried by said column to effect said movement thereof.

33. Apparatus of the character described comprising a movable device having a material supply passage, means for supporting a plurality of receptacles in each of a plurality of laterally related rows, means for moving said receptacle-supporting means in relation to the outlet of said passage to present the receptacles in each row successively to said movable device, and means for moving said movable device laterally of said receptacle rows to positions for supplying material to the receptacles therein, respectively, said latter means comprising a stationary bearing shaft and a cylinder mounted for turning movement on said shaft, said device being carried by said cylinder to effect said movement thereof.

34. Apparatus of the character described comprising a movable device having a material supply passage, means for supporting a plurality of receptacles in each of a plurality of laterally related rows, means for moving said receptacle-supporting means in relation to the outlet of said passage to present the receptacles in each row successively to said movable device, and means for moving said movable device laterally of said receptacle rows to positions for supplying material to the receptacles therein, respectively, said latter means comprising a stationary bearing shaft, a cylinder mounted for turning movement on said shaft, and a stud carried by said cylinder, said device being carried by said stud to effect said movement thereof.

35. In apparatus comprising a housing, means provided therein for supporting a plurality of receptacles in each of a plurality of laterally related rows, a movable device having a material-supply passage and mounted for movement laterally of said rows to positions for supplying material to the receptacles therein, respectively, and means for moving said receptacle-supporting means in relation to the outlet of said passage to present the receptacles in each row successively to said movable device; a bearing shaft mounted on the bottom wall of said housing and extending vertically upwardly therefrom, and means in bearing engagement with and mounted for turning movement on said shaft, said device being carried by said latter means to effect said movement thereof.

36. In apparatus comprising a housing, means provided therein for supporting a plurality of receptacles in each of a plurality of laterally related rows, a movable device having a material-supply passage and mounted for movement laterally of said rows to positions for supplying material to the receptacles therein, respectively, and means for moving said receptacle-supporting means in relation to the outlet of said passage to present the receptacles in each row successively to said movable device; a bearing shaft mounted on the bottom wall of said housing and extending vertically upwardly therefrom, and means in bearing engagement with and mounted for turning movement on said shaft, said device being carried by said latter means to effect said movement thereof, said latter means comprising a cylinder extending above the upper end of said shaft, said device being operatively engaged with the upper end of said cylinder.

GEORGE GORHAM.

REFERENCES CITED

The following references are of record in the file of this patent:

UNITED STATES PATENTS

| Number | Name | Date |
| --- | --- | --- |
| 479,812 | Johnston | Aug. 2, 1892 |
| 978,644 | Raabe | Dec. 13, 1910 |
| 1,097,708 | Elson | May 26, 1914 |
| 1,101,568 | Roberts | June 30, 1914 |
| 2,493,382 | Bell | Jan. 3, 1950 |
| 2,523,517 | Potter | Sept. 26, 1950 |

FOREIGN PATENTS

| Number | Country | Date |
| --- | --- | --- |
| 33,565 | Denmark | Aug. 18, 1924 |
| 123,173 | Great Britain | Feb. 18, 1919 |
| 574,794 | Germany | Apr. 20, 1933 |